(12) United States Patent
Petry (10) Patent No.: US 9,341,100 B2
(45) Date of Patent: May 17, 2016

(54) SYSTEM FOR ADDING AND PROCESSING REDUCING AGENT IN A MOTOR VEHICLE

(71) Applicant: Daimler AG, Stuttgart (DE)

(72) Inventor: Andreas Petry, Affalterbach (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/404,106

(22) PCT Filed: May 8, 2013

(86) PCT No.: PCT/EP2013/001372
§ 371 (c)(1),
(2) Date: Nov. 26, 2014

(87) PCT Pub. No.: WO2013/178321
PCT Pub. Date: Dec. 5, 2013

(65) Prior Publication Data
US 2015/0135683 A1 May 21, 2015

(30) Foreign Application Priority Data
Jun. 1, 2012 (DE) .......................... 10 2012 010 878

(51) Int. Cl.
*F01N 3/00* (2006.01)
*F01N 3/10* (2006.01)
(Continued)

(52) U.S. Cl.
CPC .............. *F01N 3/208* (2013.01); *F01N 3/2006* (2013.01); *F01N 3/2066* (2013.01); *F01N 13/14* (2013.01);
(Continued)

(58) Field of Classification Search
CPC ............ F01N 2610/1453; F01N 3/208; F01N 2260/20; F01N 2240/14; B01F 3/04049; B01F 3/0451
See application file for complete search history.

(56) References Cited

U.S. PATENT DOCUMENTS 4,538,413 A 9/1985 Shinzawa et al.
5,829,248 A * 11/1998 Clifton ............... F01N 3/2033
60/286
(Continued)

FOREIGN PATENT DOCUMENTS

DE 42 03 807 A1 8/1993
WO WO 2009/012885 A1 1/2009
WO WO 2012/044233 A1 4/2012

OTHER PUBLICATIONS

International Search Report (PCT/ISA/220 and PCT/ISA/210) dated Aug. 8, 2013 with English translation (seven pages).
(Continued)

*Primary Examiner* — Audrey K Bradley
*Assistant Examiner* — Jason Sheppard
(74) *Attorney, Agent, or Firm* — Crowell & Moring LLP (57) ABSTRACT

A system for adding and processing reducing agent includes an injector connected to a reducing agent metering unit and which can spray a jet of reducing agent into the exhaust gas. A mixing pipe is disposed in an exhaust pipe of the internal combustion engine and a funnel element is disposed on or in the mixing pipe in the region of the first mixing pipe end. The mixing pipe and the funnel element are formed as hollow bodies having perforated outer surfaces, the perforation of the mixing pipe has a larger surface area than the perforation of the funnel element. The funnel element has a passage opening on the end of the funnel element assigned to the first mixing pipe end, and the reducing agent metering unit is disposed such that the injector sprays the jet of reducing agent through the passage opening into the interior of the funnel element.

18 Claims, 3 Drawing Sheets

(51) Int. Cl.
 *F01N 3/20* (2006.01)
 *F01N 13/14* (2010.01)

(52) U.S. Cl.
 CPC ..... *F01N 2260/20* (2013.01); *F01N 2610/1453* (2013.01); *F01N 2900/00* (2013.01); *Y02T 10/24* (2013.01)

(56) References Cited

U.S. PATENT DOCUMENTS

| | | | | |
|---|---|---|---|---|
| 5,849,593 | A * | 12/1998 | Schmelz | B01D 53/79 436/147 |
| 2003/0079467 | A1 * | 5/2003 | Liu | B01D 53/9431 60/286 |
| 2006/0218902 | A1 | 10/2006 | Arellano et al. | |
| 2010/0263359 | A1 | 10/2010 | Haverkamp et al. | |
| 2011/0094206 | A1 | 4/2011 | Liu et al. | |
| 2011/0113759 | A1 * | 5/2011 | Tilinski | F01N 3/2066 60/295 |
| 2012/0322012 | A1 * | 12/2012 | Tsumagari | F01N 3/0256 431/159 |
| 2013/0152558 | A1 * | 6/2013 | Loman | B01F 5/045 60/317 |
| 2013/0167516 | A1 * | 7/2013 | Loman | F01N 3/2892 60/319 |

OTHER PUBLICATIONS

German-language Written Opinion (PCT/ISA/237) dated Aug. 8, 2013 (five pages).
German Search Report dated Mar. 1, 2013 with partial English translation (10 pages).

* cited by examiner

SYSTEM FOR ADDING AND PROCESSING REDUCING AGENT IN A MOTOR VEHICLE

BACKGROUND AND SUMMARY OF THE INVENTION

Exemplary embodiments of the invention relate to a reducing agent addition and preparation system in a motor vehicle, for adding a liquid reducing agent to an exhaust gas emitted by an internal combustion engine of the motor vehicle and for preparing the added reducing agent in the exhaust gas.

For exhaust after treatment, in the initial state liquid reducing agents such as mineral fuel or aqueous urea solution are often introduced into the exhaust gas of internal combustion engines. With regard to preparation of the reducing agent introduced in the liquid state, there is a problem with respect to a desired uniform distribution and with respect to evaporation. For an aqueous urea solution, there is the additional problem of releasing the ammonia, required for the selective catalytic reduction of nitrogen oxides, by hydrolysis and/or thermolysis. Various exhaust gas system variants with preparation sections, mixers, evaporators, and hydrolysis catalytic converters have already been proposed for solving the problem. Despite the numerous proposed solutions, there is still a need for improvement with regard to the preparation of reducing agents that are introduced, in particular in the liquid state, into the exhaust gas.

Exemplary embodiments of the invention are, therefore, directed to a device by means of which advantageous introduction of reducing agent and the best possible preparation of reducing agent introduced into exhaust gas of an internal combustion engine is made possible.

The reducing agent addition and preparation system according to the invention for adding a liquid reducing agent to exhaust gas emitted by an internal combustion engine of the motor vehicle and for preparing the added reducing agent in the exhaust gas includes an injector associated with a reducing agent metering unit and which may spray a reducing agent spray jet into the exhaust gas, a mixing tube situated in an exhaust tract of the internal combustion engine and having a first and a second axial mixing tube end, and a funnel element situated on or in the mixing tube in the region of the first mixing tube end and which widens conically at a predetermined widening angle in the direction from the first mixing tube end toward the second mixing tube end. The mixing tube and the funnel element are designed as hollow bodies of rotation having a respective perforated lateral surface, and the perforation of the mixing tube is designed with an at least predominantly larger surface area than the perforation of the funnel element. On its end associated with the first mixing tube end, the funnel element has a passage opening, and the reducing agent metering unit is situated in such a way that the injector may spray the reducing agent spray jet through the passage opening into the interior of the funnel element.

Due to an inflow of exhaust gas at a comparatively high velocity into the interior of the funnel element, which is made possible by the perforation of the funnel element, the spray jet sprayed into the funnel element by the injector may develop into a fine spray mist in an optimal manner at that location while avoiding wall wetting. Further transport in the direction of the second mixing tube end is made possible, and, due to the larger perforation of the mixing tube and the resulting inflow of exhaust gas into the interior of the mixing tube at a comparatively low velocity, wall wetting is likewise at least largely avoided. A preparation section is thus provided that can form a fine spray of reducing agent droplets, which advantageously may evaporate in an increasingly easier manner on their transport path. Upon exiting the second mixing tube end, the reducing agent is therefore typically at least predominantly evaporated, and a homogeneous distribution over the entire cross section of the exhaust gas line is made possible.

In one embodiment of the invention, the rotational axes of the mixing tube and the funnel element at least approximately coincide, and the passage opening is situated at least approximately centrally with respect to the rotational axis. Due to this axially aligned, rotationally symmetrical arrangement, centered spraying of the reducing agent into the funnel element is made possible, which assists in avoiding wall wetting.

In another embodiment of the invention, the injector has an injector tip at the end, wherein the injector tip and the passage opening in the funnel element in each case have an at least approximately circular perimeter, and an outlet opening for the reducing agent is situated at least approximately centrally at the injector tip, and the outlet opening and a center point of the passage opening are situated at least approximately on the rotational axis of the funnel element, and the injector tip is situated opposite from the funnel element at a small distance from the passage opening in such a way that the injector tip and a lateral surface region of the funnel element surrounding the passage opening form an annular gap through which exhaust gas may flow into the interior of the funnel element. Due to the design of the annular gap, exhaust gas entering the annular gap and passing into the interior of the funnel element may envelop the spray jet emitted by the injector from behind and transport same in the axial direction essentially free of swirl and backflow. In addition, formation of flow-related dead zones, wall wetting, and resulting deposits are avoidable due to this embodiment. It is particularly advantageous when, in another embodiment of the invention, the annular gap is dimensioned in such a way that exhaust gas flowing through the annular gap into the funnel element has an inlet velocity, at least in operating points of the internal combustion engine above partial load, which is greater than a velocity at which the injector sprays the reducing agent spray jet. As a result, particularly effective formation of a fine spray due to finer distribution of droplets of reducing agent is made possible, and the evaporation behavior is improved.

In addition, it has proven to be particularly advantageous when, in another embodiment of the invention, the injector may spray an at least approximately conically expanding reducing agent spray jet into the exhaust gas, a widening angle of the reducing agent spray jet at least approximately corresponding to the widening angle of the funnel element. This allows a uniform finer division of the droplets of reducing agent while avoiding wetting of the inner lateral surface of the funnel element and forming uniform undisturbed flow conditions.

In another embodiment of the invention, the widening angle of the funnel element is in the range between 20 degrees and 70 degrees, in particular between 30 degrees and 60 degrees. This has proven to be particularly favorable for flow and advantageous for the preparation of reducing agent.

In another embodiment of the invention, due to the perforation of the funnel element, exhaust gas flowing into the funnel element has an at least approximately perpendicular orientation with respect to an enveloping surface of the reducing agent spray jet cone of the reducing agent spray jet sprayed by the injector. An exhaust gas cushion is formed that shields the inner wall of the funnel element, thus further reducing the risk of wall wetting and promoting fragmentation of the droplets of reducing agent.

In another embodiment of the invention, the funnel element is situated at least predominantly in the interior of the mixing tube, the funnel element at its widened end inwardly resting against the lateral surface of the mixing tube all the way around or being integrally joined and/or connected in a positive-fit manner to the mixing tube. This ensures a stable arrangement of the mixing tube and funnel element with respect to one another that is particularly compact.

In another embodiment of the invention, an exhaust gas guide element is provided that directs a portion of exhaust gas flowing in the direction of the first mixing tube end to the perforated lateral surface of the funnel element, and directs a second portion in the direction of a portion of the perforated lateral surface of the mixing tube that is downstream from the funnel element. This allows flow conditions that are uniform and largely independent of the flow velocity. The exhaust gas component that is directed in the direction of the perforated lateral surface of the funnel element and that at least partially flows into the interior of the funnel element has a facilitating effect for the formation of a fine reducing agent spray. The portion of exhaust gas that is directed in the direction of the lateral surface of the mixing tube and that at least partially flows into the interior of the mixing tube results in further transport of the reducing agent.

In another embodiment of the invention, for conducting exhaust gas an exhaust gas conducting element bent in the shape of a knee is provided with a first leg on the inflow side, and a second leg, adjoining the first leg, on the outflow side, the mixing tube extending from a deflection area from the first leg to the second leg into the second leg and being situated concentrically with respect to the second leg. This allows a particularly advantageous, compact arrangement of the overall reducing agent addition and preparation system. For simplifying the connection to the exhaust gas tract, it is also advantageously provided that a first separating point for attaching an exhaust gas supply pipe is provided on an inflow-side end of the first leg, and a second separating point for connecting an exhaust gas discharge pipe is provided on the outflow-side end of the second leg. According to another advantageous embodiment of the invention, the mixing tube extends beyond the second separating point from the exhaust gas conducting element bent in the shape of a knee. In this way a flow-related adverse effect of the separating point on the preparation of the reducing agent is avoidable, since the mixing tube shields the separating point.

In another embodiment of the invention, a swirl-forming plate part is provided for the exhaust gas supply pipe. Improvement in a uniform distribution of the exhaust gas flow with regard to the cross section of the exhaust gas supply pipe is thus made possible.

It has proven to be particularly advantageous when, in another embodiment of the invention, the exhaust gas conducting element bent in the shape of a knee has an exterior thermally insulating shell, at least in sections. Heat losses in the area of the exhaust gas tract which are critical for preparing the reducing agent, which hinder evaporation of the reducing agent, are thus largely avoided or at least reduced.

In another embodiment of the invention, a flange part is provided, to which the mixing tube and the reducing agent metering unit are fastened, and to which at least one cooling plate for dissipating heat from the flange part to the surroundings is also fastened, on the outer side with respect to the exhaust gas tract. This design allows a reduction in the heat stress on the overall metering unit and in particular the injector. It is particularly advantageous when a first and a second cooling plate are provided, the first and second cooling plates being in heat transfer contact with one another via a heat transfer plate, and being held at a distance from one another by the heat transfer plate. This allows further improvement in the heat dissipation, whereby the heat transfer plate also allows targeted shaping of the temperature gradients which form, and therefore high temperatures may be kept away from critical locations in this regard in a targeted manner.

BRIEF DESCRIPTION OF THE DRAWING FIGURES

Further advantages, features, and particulars of the invention result from the following description of preferred exemplary embodiments and with reference to the drawings. The features and feature combinations mentioned above in the description as well as the features and feature combinations mentioned below in the description of the figures and/or only shown in the figures may be used not only in the particular stated combination, but also in other combinations or alone without departing from the scope of the invention. The figures show the following.

DETAILED DESCRIPTION

Figure 1:
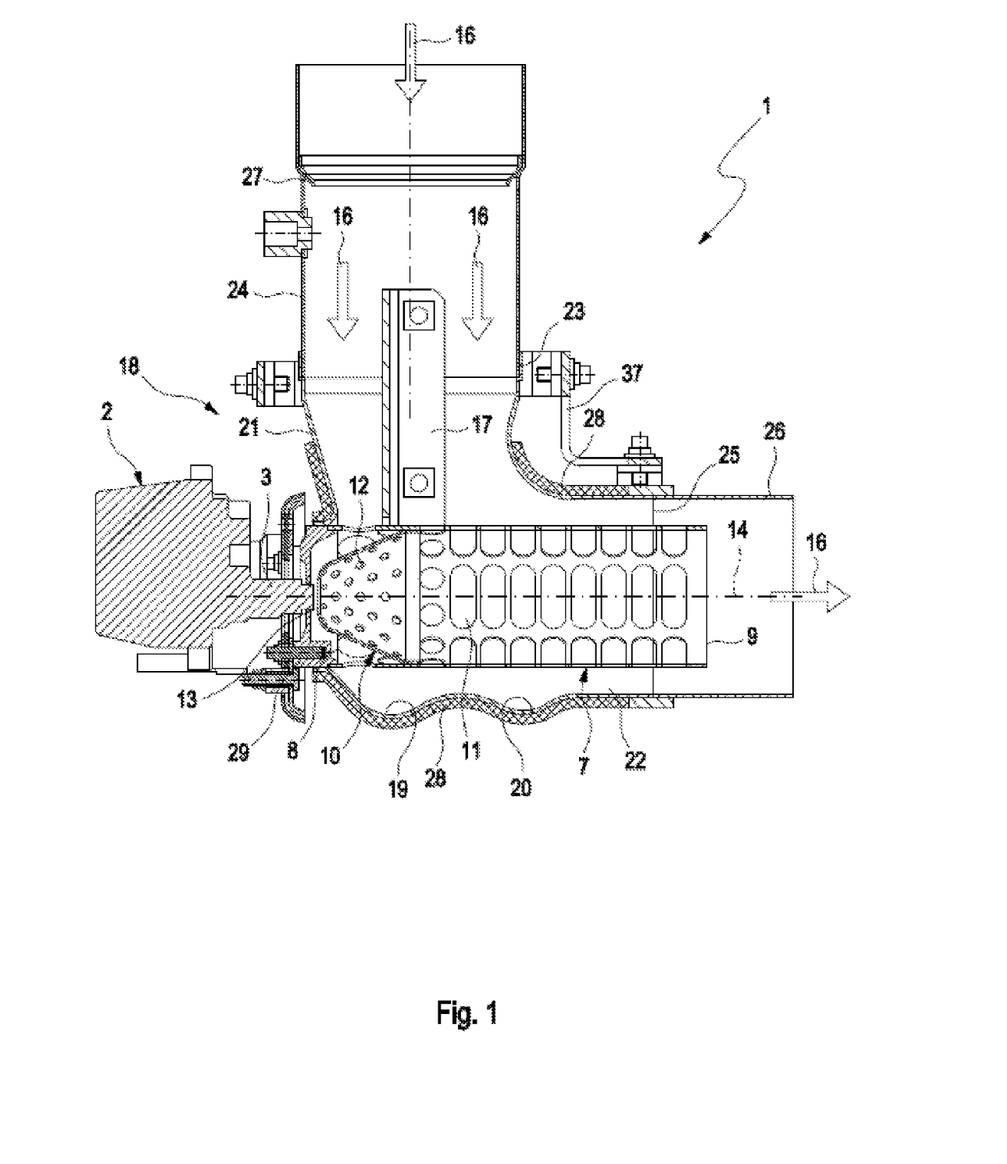
FIG. 1 shows a cross-sectional illustration of one preferred embodiment of the reducing agent addition and preparation system according to the invention.
Figure 2:
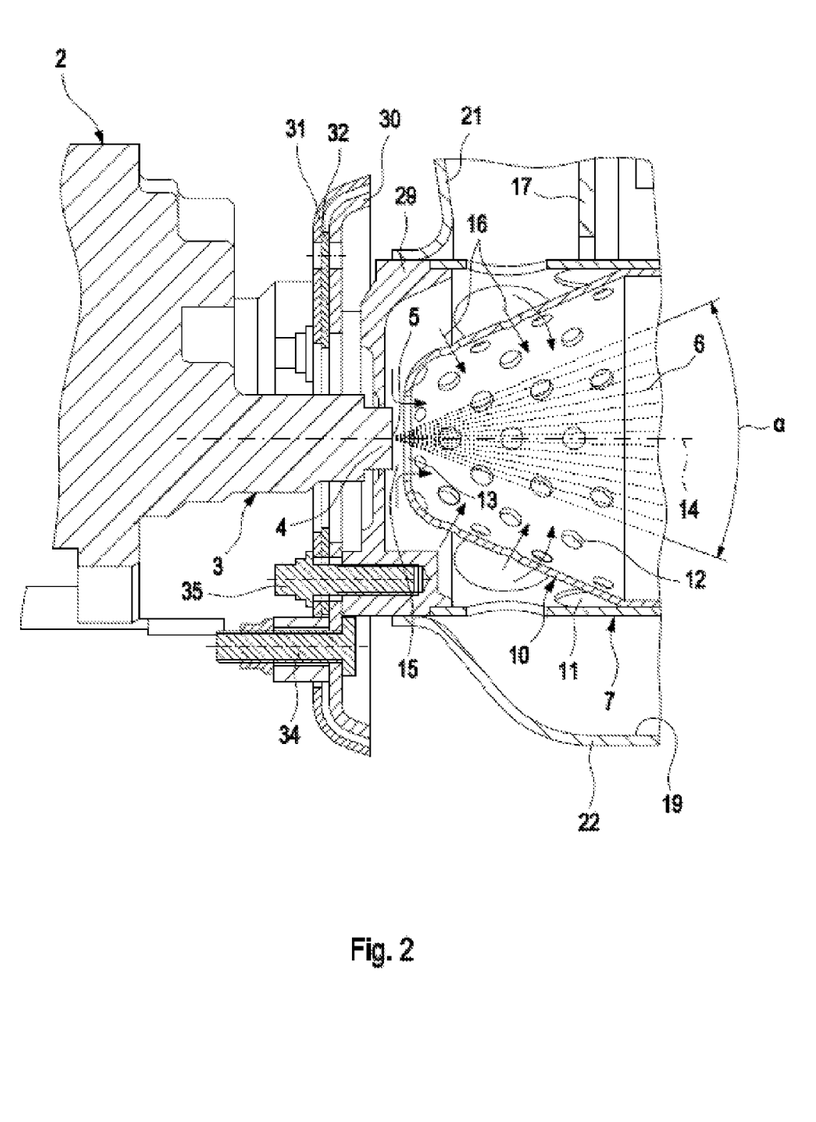
FIG. 2 shows a detail of the reducing agent addition and preparation system according to FIG. 1.

One advantageous and preferred embodiment of the reducing agent addition and preparation system according to the invention and its properties and functions are described in greater detail below with reference to FIGS. 1 and 2; identical components are denoted by the same reference numerals. FIG. 1 illustrates a cross-sectional illustration of the reducing agent addition and preparation system 1, while FIG. 2 shows a perspective view of a detail showing the conditions at an injector 3 of the reducing agent addition and preparation system 1. In the present case, the reducing agent addition and preparation system 1 illustrated in FIGS. 1 and 2 is used for the introduction, distribution, and evaporation of aqueous urea solution into an exhaust gas tract of a motor vehicle internal combustion engine, in particular a diesel engine of a utility vehicle. However, the reducing agent addition and preparation system 1 is also considered suitable for the introduction and preparation of other liquid reducing agents, for example mineral fuel, in particular diesel fuel.

According to the illustration in FIG. 1, the reducing agent addition and preparation system 1 has an exhaust gas conducting element 18, bent in the shape of a knee, whose first leg 21 on the exhaust gas inlet side is connected to an exhaust gas supply pipe 24 at a first separating point 23. An exhaust gas discharge pipe 26 is connected to a second leg 22 on the exhaust gas outlet side at a second separating point 25. The exhaust gas conducting element 18 is preferably made of two half shells, which simplifies assembly.

The reducing agent addition and preparation system 1 receives exhaust gas containing nitrogen oxides from a diesel engine (not illustrated), and the urea solution is injected into the exhaust gas. Exhaust gas enriched with urea solution leaves the reducing agent addition and preparation system 1 by exiting from the exhaust gas discharge pipe 26, and is supplied to a downstream SCR catalytic converter for selective catalytic reduction of nitrogen oxides with ammonia (likewise not illustrated in greater detail), which is released from the urea by thermolysis and/or hydrolysis. A main direction of the exhaust gas flow is indicated by arrows 16. Due to the reducing agent addition and preparation system 1, addition, distribution, and evaporation of the urea solution take place in a particularly advantageous manner, which is explained in greater detail below with general reference to preparation. It is understood that, in addition to the SCR catalytic converter, the exhaust gas control system of the diesel engine may have additional exhaust gas control elements, having catalytic or filtering activity, connected upstream and/or downstream.

For the metered addition of the urea solution to the exhaust gas, in the present case a metering unit 2 having an injector 3 is provided, whereby the injector 3 may deliver a conical spray jet 6 of the urea solution, as depicted in particular in FIG. 2. For the preparation, a mixing tube 7 designed as a hollow cylinder having a circular cross section is provided, the lateral surface of which is provided with a perforation 11 over a large surface area. The mixing tube 7 extends from a first end 8, situated close to the injector 3 in the transition area from the first leg 21 to the second leg 22, beyond the second separating point 25, to the second end 9 of the mixing tube. The mixing tube extends concentrically with respect to an axis 14 and at a comparatively small radial distance from the second leg 22 of the bent exhaust gas conducting element 18. The mixing tube 7 is supported by a flange part 29 to which the metering unit 2 is also fastened. The fastening of the metering unit 2 to the flange part 29 is explained in greater detail below with additional reference to FIG. 3.

Another part that is crucial for the preparation of the urea solution is a funnel element 10 situated in the region of the first mixing tube end 8 in the interior of the mixing tube, and which likewise has a perforated lateral surface. The funnel element 10 is designed as a body of rotation, and is preferably situated in such a way that it has the same rotational axis 14 as the mixing tube 7. In the present case, the funnel element 10 is fixedly joined, all the way around at its widened end, to the mixing tube 7 by welding, for example. The mixing tube 7 is thus divided into an upstream portion facing the injector 3 and the metering unit 2, and a downstream portion with a completely open outflow cross section. At its tapered end that is situated opposite from and at a small distance from the injector 3, the funnel element 10 has a passage opening 13 through which the injector 3 may spray the spray jet 6 into the interior of the funnel element 10. For this purpose, the injector 3 is advantageously in flush alignment with the axis 14, the outlet opening 5 of the injector at the injector tip 4 being situated on the axis 14, and thus centrally with respect to the passage opening 13 in the funnel element 10, which is apparent in particular from FIG. 2.

The particularly efficient preparation of urea solution supplied to the exhaust gas by means of the injector 3 is now explained in greater detail with further reference to FIG. 1 and FIG. 2, and is achieved with synergistically interacting measures.

For exhaust gas flowing into the exhaust gas supply pipe 24, initially a largely uniform distribution over the pipe cross section is achieved by means of a plate part 27 having a large plate hole opening. The plate opening is preferably greater than 90%, particularly preferably greater than 95%, of the pipe cross section. The pressure loss is thus kept low, while uniform distribution of the exhaust gas is still achieved due to swirling at the plate edge.

In addition, due to an exhaust gas guide element 17 extending in the longitudinal direction of the exhaust gas supply pipe 24, a division of the exhaust gas flow is achieved by a portion of the exhaust gas flow being directed onto the perforated lateral surface of the funnel element 10, and the other portion of the exhaust gas flow being directed in the direction of the part of the perforation 11 over a large surface area of the mixing tube 7 downstream therefrom. For this purpose, the exhaust gas guide element 17 extends from a location downstream from the first separating point 23 of the exhaust gas conducting element 18 to a point close to the mixing tube 7, and preferably extends at least approximately over the entire radial extent of the first leg 21 of the exhaust gas conducting element 18 and the exhaust gas supply pipe 24, and at the end encloses the mixing tube 7 at a small distance therefrom in an approximately semicircular shape.

Exhaust gas directed in the direction of the perforated lateral surface of the funnel element 10 flows through the large surface-area perforation 11 of the mixing tube 7 present at that location, predominantly into the interior of the downstream portion of the mixing tube 7 formed by the funnel element 10, and at that location meets the perforated lateral surface of the funnel element 10. To allow flow all around which is distributed as uniformly as possible, a first pocket-shaped concave area 19 is provided for the exhaust gas conducting element 18 in the transition from the first leg 21 to the second leg 22. As a result of this concave area 19, the radial distance between the mixing tube 7 and the exhaust gas conducting element 18 in the arrangement area of the funnel element 10 is increased, and the inflow conditions are homogenized all around. The increase in the diameter due to the first pocket-shaped concave area 19 is preferably approximately 10%.

A division of exhaust gas flowing in, into the funnel element 10 and into the portion of the mixing tube 7 downstream therefrom, with regard to quantity and flow velocity is determined primarily by the perforation 11, 12 of the mixing tube 7 and the funnel element 10, respectively. The perforation 11 of the mixing tube 7 is provided at least predominantly uniformly over a large surface area, in the shape of elongated holes extending in the peripheral direction. The open portion of the lateral surface of the mixing tube is preferably greater than 70%, particularly preferably greater than 80%. On the one hand, a low-swirl exhaust gas flow into the interior of the mixing tube and transport in the axial direction of urea present at that location are made possible. It is particularly preferred when, directly adjoining the contact area of the funnel element 10 with the mixing tube 7, slightly smaller perforation holes are provided all around. This contributes to position stabilization of the spray jet cone in the central area of the mixing tube 7. On the other hand, due to an exhaust gas component which flows around the mixing tube 7, the urea solution is kept away from the wall of the exhaust gas conducting element 18, in particular the second leg 22 thereof, by formation of an exhaust gas cushion. The mixing tube 7 may thus take over a control and guidance function for exhaust gas enriched with urea solution. For this purpose, the diameter of the mixing tube 7 is approximately two-thirds of the diameter of the second leg 22 of the exhaust gas conducting element 18.

For flow homogenization, in particular for allowing exhaust gas inflow into the mixing tube area situated downstream from the funnel element 10 that is as uniform as possible all around, an approximately circumferential second pocket-shaped concave area 20 of the second leg of the exhaust gas conducting element 18 is provided adjoining the first pocket-shaped concave area 19, and which also results in decreased pressure losses. In particular, a decrease in dynamic pressure at the inflection point of the exhaust gas conducting element 18 may be achieved due to the deflection of the main exhaust gas flow direction 16 occurring in the exhaust gas conducting element 18. The increase in diameter due to the second pocket-shaped concave area 20 is likewise preferably approximately 10%.

Due to the perforation 12 of the funnel element 10 that covers a much smaller surface area compared to the mixing tube 7, exhaust gas enters the interior of the funnel element 10 at a comparatively high velocity. This results in splitting of the reducing agent spray jet 6 sprayed through the passage opening 13 and into the interior of the funnel element 10 by the injector 3, and thus, a fine distribution. In addition, this enables formation of a pressure cushion which lies against the interior of the lateral surface of the funnel element 10, as the result of which wetting of the lateral surface may be effectively avoided. For this purpose, the open portion of the lateral surface of the funnel element 10 is preferably less than 30%, particularly preferably less than 20%. In one particularly preferred embodiment, the perforation 12 of the funnel element 10 is formed approximately uniformly by approximately circular holes having a diameter between 2 mm and 6 mm, preferably between 3 mm and 5 mm.

Due to the perforation holes 12 of the mixing tube 10 into the interior of the funnel element 10, entering exhaust gas preferably meets the reducing agent spray jet cone 6 forming in the interior of the funnel element 10 approximately perpendicularly. In order for the injector 3 to be able to spray urea solution into the interior of the funnel element 10, a passage opening 13 is situated at the tapered end of the funnel element 10 that is oppositely situated centrally and at a small distance from the injector tip 4. The distance of the injector tip 4 from the plane of the passage opening 13 is preferably approximately one-half to one-third the injector diameter. The passage opening 13 is preferably circular, with a diameter which approximately corresponds to the injector diameter and which is approximately 15 mm. The tapered end of the funnel element 10 is situated approximately in the region of the first mixing tube end 8 at which the mixing tube 7 is connected all around to the flange part 29. The injector 3 passes through the flange part 29, the injector tip 4 ending in approximately flush alignment with the flange part 29. The spray jet 6 emitted by the injector 3 may thus enter directly into the interior of the funnel element 10. The injector 3 preferably delivers the spray jet 6 with an output pressure of approximately 5 bar to 12 bar, particularly preferably with an output pressure of approximately 10 bar, in such a way that an at least approximately full cone is formed, with an opening angle α approximately corresponding to the opening angle of the funnel element 10. The exit velocity of the urea solution is approximately 15 m/s, as the result of which fairly large droplets of reducing agent are carried comparatively far into the interior of the funnel element 10 or beyond, and may dissociate into smaller droplets, thus forming a fine spray overall.

The injector tip 4 and the region of the lateral surface of the funnel element 10 surrounding the passage opening 13 form an annular gap 15 through which exhaust gas, after a deflection of approximately 90 degrees in an approximately axial direction, may enter the funnel element 10. The annular gap 15 is dimensioned by the arrangement of the injector tip 4 and the funnel element 10, and by the size of the passage opening 13 and the injector tip 4, in such a way that an inflow velocity of exhaust gas flowing through the annular gap 15 into the funnel element 10, at least above a partial load operation of the diesel engine, results which is greater than the exit velocity of the urea solution from the injector 3. An exhaust gas inflow velocity of greater than 15 m/s in load ranges with greater than 20% nominal load of the diesel engine is preferably achieved. An exhaust gas velocity is preferably present in the predominant load range of the diesel engine, at least in the interior area of the funnel element 10, which exceeds the initial velocity of the reducing agent spray jet 6. This promotes the splitting of larger droplets of reducing agent and the formation of a preferably fine spray. Another general advantage of the exhaust gas entering through the annular gap 15 into the funnel element 10 lies in the effect of the exhaust gas on the transport of the reducing agent spray jet in the axial direction. In addition, due to the essentially axial exhaust gas flow, which already envelops the reducing agent spray jet in an early stage of the generation, recirculation of the reducing agent and flow-related dead zones, in particular in the tapered area of the funnel element 10, are avoided. The injector tip 4 is preferably beveled to improve the inflow conditions of exhaust gas through the annular gap 15 into the interior of the funnel element 10.

Figure 3:
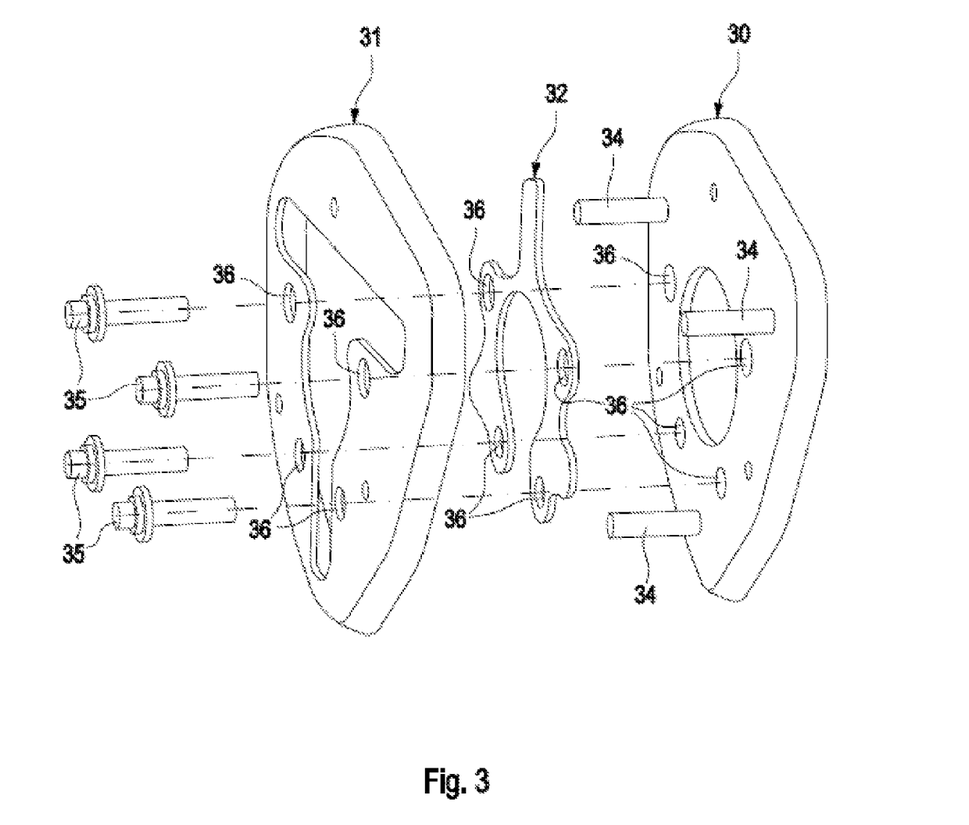
FIG. 3 shows a perspective illustration of a cooling plate arrangement for cooling the metering unit.

Particularly effective and at least essentially deposit-free preparation, as well as rapid evaporation on short path lengths of urea solution added to the exhaust gas by means of the injector 3, are made possible due to the described measures. To avoid to the greatest extent possible undesirable deposits at the injector tip 4, which are favored in particular at elevated temperatures, measures are explained in greater detail below for effective heat dissipation from the flange part 29 which is exposed to the hot exhaust gas. In this regard, reference is made to FIGS. 2 and 3; FIG. 3 in particular illustrates a cooling plate arrangement for cooling and fastening of the metering unit 2.

In the present case, the cooling plate arrangement illustrated in FIG. 3 includes a first cooling plate 30 and a second cooling plate 31 which are mounted one on top of the other with a heat transfer plate 32 in between. The metering unit 2 is fastened directly to the first cooling plate 30 by means of screw connections 34, which in the present case are designed as stay bolts which are fixedly joined to the first cooling plate. The first cooling plate 30 thus not only provides a cooling surface, but also has a support function. The cooling plate arrangement, i.e., the first and the second cooling plate 30, 31 and the heat transfer plate 32, are fixedly attached to the flange part 29 via screws 35. For the fastening, the screws 35 are inserted through corresponding passage openings 36 in the first and second cooling plate 30, 31 and in the heat transfer plate 32, and are screwed into the flange part 29. This results in heat transfer from the flange part 29, which is exposed to the hot exhaust gas, to the cooling plate arrangement, primarily via the screws 35. Particularly effective cooling that avoids overheating of the metering unit 2 is now achieved due to the fact that, by means of the heat transfer plate 32, on the one hand the heat transferred from the flange part 29 is distributed to the first cooling plate 30, and on the other hand is distributed to the second cooling plate 31, thus approximately doubling the cooling effect in comparison to a single cooling plate. The heat transfer plate 32 provides distance spacing between the two cooling plates 30 and 31, thus improving the convective heat dissipation to the surroundings. In addition, targeted heat dissipation takes place in noncritical areas of the cooling plates 30, 31 due to the special lobe-shaped design of the heat transfer plate 32. As a result of the effective heat dissipation which is made possible by this design of the cooling plate arrangement, the temperature of the metering unit 2 and of the injector may be kept comparatively low.

It is also pointed out that fastening of the reducing agent addition and preparation system 1 to various exhaust gas systems is made possible by a frame holder 37, which is only partially visible or shown in FIG. 1. The frame holder 37 additionally allows mechanical fixing of the joined-together exhaust gas line and pipe elements 18, 24, 26 to the separating points 23, 25.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

1 Reducing agent addition and preparation system
2 Reducing agent metering unit
3 Injector
4 Injector tip
5 Injector outlet opening
6 Reducing agent spray jet
7 Mixing tube
8 First mixing tube end
9 Second mixing tube end
10 Funnel element
11 Mixing tube perforation
12 Funnel element perforation
13 Funnel element passage opening
14 Rotational axis
15 Annular gap
16 Arrow: exhaust gas flow
α Spray jet widening angle
17 Exhaust gas guide element
18 Exhaust gas conducting element
19 First pocket-shaped concave area
20 Second pocket-shaped concave area
21 First leg of exhaust gas conducting element
22 Second leg of exhaust gas conducting element
23 First separating point
24 Exhaust gas supply pipe
25 Second separating point
26 Exhaust gas discharge pipe
27 Plate part
28 Thermally insulating shell
29 Flange part
30 First cooling plate
31 Second cooling plate
32 Heat transfer plate
34 Screw connection for metering unit
35 Screws
36 Passage openings
37 Frame holder

The invention claimed is:

1. A reducing agent addition and preparation system of a motor vehicle, configured to add a liquid reducing agent to exhaust gas emitted by an internal combustion engine of the motor vehicle and to prepare the added reducing agent in the exhaust gas, the system comprising:
a reducing agent metering unit;
an injector connected to the reducing agent metering unit and configured to spray a reducing agent spray jet into the exhaust gas;
a mixing tube situated in an exhaust tract of the internal combustion engine and having a first and a second axial mixing tube end; and
a funnel element situated on or in the mixing tube in a region of the first mixing tube end, wherein the funnel element widens conically at a predetermined widening angle in a direction from the first mixing tube end toward the second mixing tube end,
wherein the mixing tube and the funnel element are hollow bodies having a respective perforated lateral surface, and a perforation of the mixing tube has an at least predominantly larger surface area than a perforation of the funnel element,
wherein the funnel element has a passage opening on an end of the funnel element situated on or in the first mixing tube end, and
wherein the reducing agent metering unit is situated in such a way that the injector sprays the reducing agent spray jet through the funnel element passage opening into an interior of the funnel element.

2. The reducing agent addition and preparation system of claim 1, wherein rotational axes of the mixing tube and the funnel element at least approximately coincide, and the funnel element passage opening is situated at least approximately centrally with respect to the rotational axis.

3. The reducing agent addition and preparation system of claim 1, wherein an end of the injector has an injector tip, wherein the injector tip and the funnel element passage opening each have an at least approximately circular perimeter, and the end of the injector has an outlet opening for the reducing agent situated at least approximately centrally at the injector tip, and the outlet opening and center point of the of the passage opening are situated at least approximately on a rotational axis of the funnel element.

4. The reducing agent addition and preparation system of claim 3, wherein the injector tip is situated opposite from the funnel element at a small distance from the passage opening in such a way that the injector tip and a lateral surface region of the funnel element surrounding the passage opening form an annular gap through which exhaust gas flows into the interior of the funnel element.

5. The reducing agent addition and preparation system of claim 4, wherein the annular gap is dimensioned in such a way that exhaust gas flowing through the annular gap into the funnel element has an inlet velocity, at least in operating points of the internal combustion engine above partial load, which is greater than a velocity at which the injector sprays the reducing agent spray jet.

6. The reducing agent addition and preparation system of claim 1, wherein the injector sprays an at least approximately conically expanding reducing agent spray jet into the exhaust gas, a widening angle of the reducing agent spray jet at least approximately corresponding to the widening angle of the funnel element.

7. The reducing agent addition and preparation system of claim 1, wherein the widening angle of the funnel element is in a range between 20 degrees and 70 degrees.

8. The reducing agent addition and preparation system of claim 1, wherein the widening angle of the funnel element is in a range between 30 degrees and 60 degrees.

9. The reducing agent addition and preparation system of claim 1, wherein exhaust gas flowing through the perforation of the funnel element into the funnel element has an at least approximately perpendicular orientation with respect to an enveloping surface of the reducing agent spray jet cone of the reducing agent spray jet sprayed by the injector.

10. The reducing agent addition and preparation system of claim 1, wherein the funnel element is situated at least predominantly in an interior of the mixing tube, the funnel element at its widened end inwardly resting against a lateral surface of the mixing tube all the way around or being integrally joined or connected in a positive-fit manner to the mixing tube.

11. The reducing agent addition and preparation system of claim 1, further comprising:
an exhaust gas guide element configured to direct a first portion of exhaust gas flowing in a direction of the first mixing tube end to the perforated lateral surface of the funnel element, and a second portion in the direction of a portion of the perforated lateral surface of the mixing tube that is downstream from the funnel element.

12. The reducing agent addition and preparation system of claim 1, further comprising:
an exhaust gas conducting element bent in the shape of a knee with a first leg on an inflow side, and a second leg, adjoining the first leg, on an outflow side, wherein the mixing tube extends from a deflection area from the first leg to the second leg into the second leg and is situated concentrically with respect to the second leg.

13. The reducing agent addition and preparation system of claim 12, wherein an inflow-side end of the first leg includes a first separating point for attaching an exhaust gas supply pipe, and an outflow-side end of the second leg includes a second separating point for connecting an exhaust gas discharge pipe.

14. The reducing agent addition and preparation system of claim 13, wherein the mixing tube extends beyond the second separating point from the exhaust gas conducting element bent in the shape of a knee.

15. The reducing agent addition and preparation system of claim 13, wherein a swirl-forming plate part is provided for the exhaust gas supply pipe.

16. The reducing agent addition and preparation system of claim 12, wherein the exhaust gas conducting element bent in the shape of a knee has an exterior thermally insulating shell, at least in sections.

17. The reducing agent addition and preparation system of claim 1, further comprising:
a flange part, to which the mixing tube and the reducing agent metering unit are fastened, and to which at least one cooling plate for dissipating heat from the flange part to surroundings is also fastened, on the outer side with respect to the exhaust gas tract.

18. The reducing agent addition and preparation system of claim 17, further comprising:
a first and a second cooling plate, wherein the first and second cooling plates being in heat transfer contact with one another via a heat transfer plate, and are held at a distance from one another by the heat transfer plate.

\* \* \* \* \*